Patented Oct. 6, 1931

1,825,834

UNITED STATES PATENT OFFICE

EDWARD THOMAS, OF NEW YORK, N. Y.

COMPOSITION AND PROCESS FOR PRODUCING AND USING IT

No Drawing.   Application filed January 17, 1924.   Serial No. 686,895.

This invention relates to compositions containing aggregates together with binding materials having preferential affinities for the aggregates, and to processes for producing and using the compositions.

According to the present invention the insoluble aggregate is subjected to a suitable agitation, such as the agitation used in the froth-flotation process, in a suitable liquid, together with the binding material, with the result that the aggregate is coated by the material. Usually the liquid is water and the binding material is insoluble or nearly insoluble in the water. If the binding material is normally solid it is liquified either by heat or by some solvent, the latter being often preferably insoluble in the water or other liquid. The mixture of the aggregate and the liquid, such as water, is hereinafter called a pulp, in conformity with the usage in the froth-flotation art. The pulp usually is a freely flowing one, the amount of aggregate and its character determining in what proportion it may be added to the liquid and give freely flowing pulp. In general the finer the aggregate the less it is possible to include satisfactorily in the pulp, and a fibrous aggregate is to be used in smaller proportions than a non-fibrous one,—these conditions arising from the need of keeping the viscosity of the pulp low enough for the purpose in hand. Generally the binding material is added to the pulp in much less quantity than the amount of aggregate present, and is usually added very slowly,—a drop at a time in laboratory work. This seems to result in ultra microscopic dissemination and gives a desirable uniform coating,—usually a thin coating only is desired. Many materials coated with the right amount of suitable liquid in this way can be easily molded and pressed into masses that will bear rough handling. Sometimes the pressure needed may reach two tons to the square inch.

Sometimes the aggregate needs to be treated before admixture with the binding material or in its presence. For example treatment with a suitable quantity of alum will often cause cellulose to take up asphaltum or rubber by preferential affinity in the presence of water. The binding material itself may be treated, as by adding sulphur to a rubber binding material. The resulting mixture may itself be subjected to treatment as by the presence of vulcanization accelerator, so that ultimately a cellulose-rubber-bound-vulcanized material is obtained in the wet way, but which may be easily pressed to dry it. Only experiment can determine the exact conditions for coating any given aggregate with any given binding material. The following are examples of laboratory methods for determining what may be done on a large scale.

*Example I*

One-quarter ounce of the second-hand paper pulp used for making roofing materials was agitated in about twelve ounces of water as for the froth-flotation ore concentration process, as in a Hamilton-Beach bar-mixer. To this was added five and one-half grains of ammonia alum dissolved in about an ounce of water, and agitation continued. Then, during agitation, there was added drop by drop sixty drops of a solution of one part of asphalt in two parts of motor benzole. The fibres of the pulp took up the asphalt and were apparently uniformly colored by it. They floated clear of the bottom before removal from the jar.

*Example II*

Example I was repeated with the same kind of result using a pulp of a cheap drug store white filter paper instead of the Barrett pulp yielding a strong light grey pulp when dry.

*Example III*

One-fourth ounce white filter paper was agitated until it was disintegrated in about twelve ounces of water then was added a dilute solution containing 5½ grains C. P. crystals of sulphate of zinc. Then was added 21 drops of the asphalt solution. The asphalt was taken up by the paper pulp.

*Example IV*

One ounce of dry chrome green was agitated in six ounces of water with two drops of Turkey Red Oil, and then was added about a twentieth of an ounce of heavy petroleum lubricating oil and there was obtained a deep floating froth concentrate.

*Example V*

A small part of the froth was added to the coated pulp of Example III and there was obtained a colored pulp from which nearly clear water drained and which dried strong, bright in color, and not easily giving up the color.

*Example VI*

One-fourth ounce of the white filter paper was agitated to disintegrate it in about ten ounces of water, then was added 5½ grains of the sulphate of zinc in dilute solution, then was added about a twentieth of an ounce of the oil which was absorbed producing a deep yellow pulp, during the agitation then was added 21 drops of the asphalt solution which was absorbed.

*Example VII*

About three-fourths ounce of a heavy vermillion was agitated in four ounces of water. This formed some froth. A deep rich floating froth was produced when there was added about a twentieth of an ounce of the oil.

*Example VIII*

A small part of the vermillion froth was added to the pulp of the previous example, forming a pulp from which almost clear water drained and which dried strong, bright in color, and not easily giving it up.

*Example IX*

To make a test of asphalt coated pulp, a thin pulp of second-hand material like that of Example I was beaten in a laboratory paper beater modelled on the commercial type, and a dilute solution of ammonia alum was added at the intake of the beater blades to add six per cent of alum measured on the fibre, then a solution of asphalt was added at the same point slowly until the added asphalt equalled three per cent of the dry pulp, and laboratory test sheets of paper were made to compart with other sheets, some lacking asphalt and some lacking both alum and asphalt. It was found that the thoroughly dried sheets of wholly untreated paper absorbed six to nine times as much water, and those of pulp treated with only alum absorbed three to four times as much water as did the sheets of paper of alum-asphalt treated pulp.

*Example X*

One-fourth ounce of the white filter paper was agitated until disintegrated and then with 5½ grains ferrous sulphate (clean green copperas crystals) and then was added 40 drops of the asphalt solution. This was absorbed making a strong light brown pulp from which water ran off clear. If the asphalt was not added promptly the iron-coated cellulose turned a bright red.

*Example XI*

Asphalt coated alumed pulp was agitated as in Example VI but with a small part of the green float concentrate of Example IV and there was obtained a green pulp which dried to almost match the dried pulp of Example XVII.

The asphalt used in these examples was selected as having a melting point well above the temperature of boiling water, and yet not extraordinarily hard. The motor benzole was used instead of the other solvents that could have been used because experience in the froth-flotation process seems to indicate that materially better results are often obtained by using solvent substances of the benzene series rather than other hydro-carbons.

The clear water beneath the floating cellulose pulps, of the various examples, supra, especially in connection with the ferrous sulphate-treated pulp, indicates that the procedure is valuable not only for making strong paper, but also for saving many of the fibres that are now lost in the run-off from paper-making machines. Unless it is desired to coat the paper pulp with asphalt or other oil-like material for this or other purpose, some pigments may be caused to adhere by treatment of the pigment only. In other cases coating of the paper pulp only may be desirable. The experience in the froth-flotation process indicates that even better results are to be obtained by the use of emulsified oil-like or hydrocarbon material, or a hot pulp, or both. Coal tar or pitch may be oil-like material thus used. Other suitable substances may be used instead of the sulphates or the sulphonated oil as affinity modifying substances, some dyes are effective in this way even with mineral substances.

Having thus described certain embodiments of the invention what is claimed is:

1. The process of making a shaped plastic mass from a finely divided substance bound together with a petroleum product in liquid form which is insoluble in water and normally has no affinity for the substance, consisting in agitating an aqueous pulp of the substance with an affinity-modifying material and with the petroleum product so as to finely disseminate the latter in the water and cause the substance to take it up in such a film that the petroleum product is substantially imperceptible and serves as a binding medium, and shaping the coated substance as a plastic mass.

2. The process of making a shaped plastic mass from a finely divided fibrous substance bound together with a petroleum product in liquid form which is insoluble in water and normally has no affinity for the substance, consisting in agitating an aqueous pulp of the fiber containing a very large proportion of water with an affinity-modifying material and in the presence of the petroleum product so that the petroleum product is finely disseminated through the water and the substance takes it up in such a film that the petroleum product is substantially imperceptible and serves as a binding medium, and shaping the coated substance as a plastic mass.

3. The process of making a shaped plastic mass from a finely divided substance bound together with an oily petroleum product containing substantially no combined inorganic atomic elements and normally having no affinity for the substance, which consists in agitating an aqueous pulp of the substance with an affinity-modifying material and in that presence of the oily petroleum product so that the oily petroleum product is finely disseminated through the water and the substance takes it up in such a film that the oily petroleum product is substantially imperceptible and serves as a binding medium, and shaping the film-coated substance as a plastic mass.

4. The process of making a shaped plastic mass from a finely divided fibrous substance bound together by an oily petroleum product containing substantially no combined inorganic atomic elements and normally having no affinity for the substance which consists in agitating an aqueous pulp of the substance with an affinity-modifying material and in the presence of the oil petroleum product so that the oily petroleum product is finely disseminated through the water and the substance takes it up in such a film that the oily petroleum product is substantially imperceptible and serves as a binding medium, and shaping the film-coated substance as plastic mass.

5. The process of making a shaped plastic mass of paper fiber pulp bound together with an oily petroleum product containing substantially no combined inorganic atomic elements and normally having no affinity for the paper fiber which consists in agitating an aqueous pulp of the paper with an affinity-modifying material and in the presence of the oily petroleum product so that the oily petroleum product is finely disseminated through the water and the fibre takes it up in such a film that the oily petroleum product is substantially imperceptible and serves as a binding medium, and shaping the film-coated fibre as a plastic mass.

6. The process of making a shaped plastic mass of paper fibre pulp bound together with an oily petroleum product containing substantially no combined inorganic atomic ingredients and normally having no affinity for the fibre which consists in agitating an aqueous pulp of the fibre with alum and in the presence of the oily petroleum product so that the oil petroleum product is finely disseminated through the water and the fibre takes it up in such a film that the oily petroleum product is substantially imperceptible and serves as a binding medium, and shaping the film-coated fibres as a plastic mass.

7. A paper fibre product containing a petroleum product deposited upon its fibres so as to be substantially imperceptible and yet serves as a medium binding the fibres so that the dry paper is as strong as similar paper without said product upon its fibres and that the wet paper is much stronger than similar paper without said product upon its fibres.

In testimony whereof, I have affixed my signature to this specification.

EDWARD THOMAS.